United States Patent
Tsirkin (10) Patent No.: US 11,397,602 B2
(45) Date of Patent: Jul. 26, 2022

(54) PROCESSOR CONTROL REGISTER CONFIGURATION SUPPORT

(71) Applicant: Red Hat, Inc., Raleigh, NC (US)

(72) Inventor: Michael Tsirkin, Westford, MA (US)

(73) Assignee: RED HAT INC., Raleigh, NC (US)

(*) Notice: Subject to any disclaimer, the term of this patent is extended or adjusted under 35 U.S.C. 154(b) by 287 days.

(21) Appl. No.: 16/857,455

(22) Filed: Apr. 24, 2020

(65) Prior Publication Data

US 2021/0334122 A1 Oct. 28, 2021

(51) Int. Cl.
| | |
|---|---|
| G06F 9/455 | (2018.01) |
| G06F 9/445 | (2018.01) |
| G06F 9/30 | (2018.01) |
| G06F 9/4401 | (2018.01) |

(52) U.S. Cl.
CPC ...... *G06F 9/45545* (2013.01); *G06F 9/30101* (2013.01); *G06F 9/4406* (2013.01); *G06F 9/44505* (2013.01); *G06F 9/45558* (2013.01); *G06F 2009/45591* (2013.01)

(58) Field of Classification Search
CPC ............. G06F 9/45545; G06F 9/30101; G06F 9/4406; G06F 9/44505; G06F 9/45558; G06F 2009/45591; G06F 2009/45583; G06F 12/1009; G06F 12/14; G06F 12/1416; G06F 12/1458; G06F 12/149; G06F 2212/1052; G06F 2212/151; G06F 21/60; G06F 21/78; G06F 21/79
See application file for complete search history.

(56) References Cited

U.S. PATENT DOCUMENTS

| | | | |
|---|---|---|---|
| 9,910,611 B2 | 3/2018 | Koufaty et al. | |
| 9,952,890 B2* | 4/2018 | Tsirkin | .............. G06F 11/362 |
| 10,324,863 B2 | 6/2019 | Lemay et al. | |
| 10,515,023 B2 | 12/2019 | Sahita et al. | |
| 2014/0330948 A1* | 11/2014 | Dunn | ..................... G06F 9/5077 |
| | | | 709/221 |
| 2015/0319160 A1* | 11/2015 | Ferguson | ............ G06F 21/6281 |
| | | | 726/10 |

(Continued)

OTHER PUBLICATIONS

Wikipedia contributors; "Control Register"; Wikipedia, The Free Encyclopedia; Retrieved from https://en.wikipedia.org/wiki/Control_register on Apr. 3, 2020; 4 pgs.

(Continued)

*Primary Examiner* — Emerson C Puente
*Assistant Examiner* — Zhi Chen
(74) *Attorney, Agent, or Firm* — K&L Gates LLP (57) ABSTRACT

A system includes a memory, a processor, a control register, and a hypervisor. The hypervisor is configured to determine a fault resulting from a guest attempting to execute code on a memory page designated as non-executable. The hypervisor changes a configuration of the control register to an unlocked configuration based at least in part on the fault and designates the memory page as executable. A hypercall is received from the guest after booting a new operating system from the currently-executing operating system. The hypervisor is further configured to change the configuration of the control register to a locked configuration and designate the memory page as non-executable.

20 Claims, 6 Drawing Sheets

(56) References Cited

U.S. PATENT DOCUMENTS

| | | | | |
|---|---|---|---|---|
| 2016/0147556 A1* | 5/2016 | Hu | .................... | G06F 9/45558 |
| | | | | 718/1 |
| 2017/0249263 A1* | 8/2017 | Tsirkin | ................... | G06F 21/53 |
| 2018/0247069 A1* | 8/2018 | Tang | ...................... | G06F 21/52 |
| 2021/0182401 A1* | 6/2021 | Paolino | ................ | G06F 9/4411 |

OTHER PUBLICATIONS

Wikipedia contributors; kexec; Wikipedia, The Free Encyclopedia; Retrieved from https://en.wikipedia.org/wiki/Kexec on Apr. 3, 2020; 4 pgs.

Goyal et al.; Kdump, A Kexec-based Kernel Crash Dumping Mechanism; IBM; Linux 2NetworkX; 12 pgs; 2005.

Author Unknown: Intel® 64 and IA-32 Architectures Software Developer's Manual vol. 3A: System Programming Guide, Part 1; Intel; 640 pgs; Jun. 2006.

Author Unknown: AMD64 Architecture Programmer's Manual vol. 2: System Programming; Advanced Micro Devices; 710 pgs; Apr. 2020.

Cook; Cook: Security things in Linux v5.3; Eklektix, Inc.; 4 pgs; Nov. 15, 2019; Downloaded from https://lwn.net/Articles/804849 on Apr. 8, 2020.

* cited by examiner

PROCESSOR CONTROL REGISTER CONFIGURATION SUPPORT

BACKGROUND

Virtualization may be used to provide some physical components as logical objects in order to allow running various software modules, for example, multiple operating systems, concurrently and in isolation from other software modules, on one or more interconnected physical computer systems. Virtualization may allow, for example, for consolidating multiple physical servers into one physical server running multiple guest virtual machines in order to improve the hardware utilization rate.

Virtualization may be achieved by running a software layer, often referred to as a hypervisor, above the hardware and below the guest virtual machines. A hypervisor may run directly on the server hardware without an operating system beneath it or as an application running on a traditional operating system. A hypervisor may virtualize the physical layer and provide interfaces between the underlying hardware and guest virtual machines. Processor virtualization may be implemented by the hypervisor scheduling time slots on one or more physical processors for execution of a guest virtual machine, rather than a guest virtual machine executing on a dedicated physical processor.

SUMMARY

The present disclosure provides new and innovative systems and methods providing processor configuration support for booting a new operating system from a currently-executing operating system. In an example, a system includes a memory, a processor in communication with the memory, a control register in communication with the processor, and a hypervisor. The hypervisor is configured to determine a fault resulting from a guest attempting to execute first code from a memory page designated as non-executable. The first code is configured to cause a new operating system to boot from a currently-executing operating system. In the example, the hypervisor changes a configuration of the control register from a locked configuration to an unlocked configuration based at least in part on the fault. In the example, the hypervisor is further configured to receive a hypercall from the guest after execution of the first code. The hypercall indicates that the control register has been configured by the guest after booting the new operating system. In the example, the hypervisor may change the configuration of the control register from the unlocked configuration to the locked configuration. Further, in the example, the hypervisor may change the memory page from executable to non-executable.

In an example, a method includes determining, by a hypervisor, a fault resulting from a guest attempting to execute first code from a memory page designated as non-executable. The first code is configured to cause a new operating system to boot from a currently-executing operating system. The method also includes changing, by the hypervisor, a configuration of a control register associated with a processor from a locked configuration to an unlocked configuration based at least in part on the fault. The method may include changing, by the hypervisor, the memory page from non-executable to executable. The method may also include receiving, by the hypervisor from the guest after execution of the first code, a hypercall indicating that the control register has been configured by the guest after booting the new operating system. The method may include changing, by the hypervisor, the configuration of the control register from the unlocked configuration to the locked configuration, and changing the memory page from executable to non-executable.

In an example, a non-transitory machine readable medium stores a program, which when executed by a processor causes a hypervisor to determine a fault resulting from a guest attempting to execute first code from a memory page designated as non-executable. The first code is configured to cause a new operating system to boot from a currently-executing operating system. The program also causes the hypervisor to change a configuration of a control register associated with the processor from a locked configuration to an unlocked configuration based at least in part on the fault. The program may also causes the hypervisor to change the memory page from non-executable to executable. The program may also cause the hypervisor to receive a hypercall from the guest after execution of the first code. The hypercall indicates that the control register has been configured by the guest after booting the new operating system. The program may cause the hypervisor to change the configuration of the control register from the unlocked configuration to the locked configuration, and change the memory page from executable to non-executable.

Additional features and advantages of the disclosed method and system are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing processor control register (e.g., central processing unit ("CPU") control register) configuration support. Although CPU control registers are generally referred to herein, the various techniques described may be applicable to other control registers potentially associated with other non-CPU types of processors (e.g., a control register associated with a graphical processing unit, etc.). However, for brevity and clarity the various examples described herein generally refer to CPU control registers. In some CPU implementations CPU protections are implemented to prevent malicious attacks and/or unauthorized attempts to gain root level access to a computing system. For example, supervisor mode access prevention ("SMAP") is a feature of various CPU implementations that allows applications with supervisor mode access privileges to optionally set user-space memory mappings so that access to those memory mappings from supervisor mode causes a fault.

In the absence of SMAP, supervisor-privileged code usually has read and write access to user-space memory mappings (or has the ability to obtain access). This has led to the development of several security exploits, including privilege escalation exploits, which operate by causing the kernel to access user-space memory. Operating systems can block these exploits by using SMAP to force unintended user-space memory accesses to trigger page faults. Additionally, SMAP can expose flawed kernel code which does not follow the intended procedures for accessing user-space memory.

Another CPU protection that has been implemented is supervisor mode execution prevention ("SMEP"), SMEP is used to prevent supervisor mode from unintentionally executing user space code by causing a fault when an attempt is made to execute user space code from supervisor mode (e.g., by an operating system kernel). Bits in CPU control register 4 ("CR4") may be used to enable/disable SMAP and SMEP. For example, in the x86-64 instruction set architecture, bits 20 and 21 in CR4 enable SMEP and SMAP, respectively, when set.

Another example CPU protection that has been implemented is write protect ("WP"). Write protect, when enabled, prevents the CPU from writing to read-only pages when the privilege level is 0. In the x86-64 instruction set architecture, bit 16 in CR0 enables wtite protect, when set.

Malicious attacks have recently sought to disable such CPU protections in furtherance of the attack. Disabling SMAP and SMEP allows an attacker to access user space memory and execute user space code, opening up the attack to increased flexibility. Disabling write protect allows an attacker to write to read-only memory like the operating system code and/or kernel code itself. To prevent malicious attackers from disabling such CPU protections, the operating system (e.g., the kernel) may add one or more sensitive bits to the control registers to prevent attackers from disabling the protections described above. Such sensitive bits are access control flags that prevent instructions that lack the requisite privilege level from changing bit values in the control register, directory, and/or file with which the sensitive bit is associated. Associating a sensitive bit with a control register is sometimes referred to as "pinning" the bit to the control register. A CPU control register with a pinned sensitive bit is sometimes referred to as having a "sticky" CPU configuration, as the sensitive bit prevents guests (and/or other users without the requisite privilege level) from changing the CPU configuration without a CPU reset.

Various operating systems are able to boot a new operating system (and/or a new kernel) from a currently-executing operating system (and/or a currently-executing kernel). For example, kexec is a mechanism or component of the Linux kernel that allows booting of a new kernel from the currently existing kernel. kexec skips the bootloader stage and hardware initialization phase performed by the system firmware (e.g., BIOS or UEFI), and directly loads the new kernel into main memory and begins execution. Booting a new operating system from a currently-executing operating system using kexec (or a similar mechanism) avoids the long wait times associated with a CPU reset (e.g., a full reboot) and may enable systems to meet high-availability requirements by minimizing downtime. Although kexec is a specific mechanism of the Linux kernel, the term "kexec," as used herein, may also refer more generally to any mechanism whereby a new operating system is booted directly from a currently-executing operating system while skipping one or more of the bootloader stage and hardware initialization phases.

An operating system may comprise a supervisor, a bootloader, a firmware component, a user space component, one or more application components, etc. As described above, typically, in order to change the values/configuration of CPU control registers, a CPU reset is needed. Since operations such as kexec, that boot new operating systems from currently-executing operating systems, do not include CPU resets, such operations may have no opportunity to change the CPU configuration when booting the new operating system from the currently-executing operating system. Accordingly, various embodiments described herein provide CPU control register configuration support for kexec.

In various example embodiments described herein, a guest may allocate a startup page in memory that includes a branch to a kexec routine (or other code effective to cause a new operating system to boot from a currently-executing operating system). The startup page may be passed from the guest to the hypervisor and may be designated non-executable by the hypervisor. The kexec routine may be modified to execute the code at the offset of the branch to the kexec routine on the startup page instead of jumping directly to the kexec initialization routine.

Thereafter, when a guest attempts to execute the kexec routine, a startup page fault occurs due to the attempt to execute code on a memory page designated as non-executable. Upon detection by the hypervisor of the startup page fault, the hypervisor may change a configuration of one or more control registers (e.g., CR4, CR0, etc.) from a locked configuration to an unlocked configuration to allow the guest to change one or more of the bits in the unlocked control registers. Additionally, the hypervisor may change the designation of the startup page that includes the branch to the kexec routine from non-executable to executable and may re-enter the guest. The guest may thereafter execute the kexec routine and may set up the unlocked control registers. After configuring the control registers, the guest may make a hypercall causing the hypervisor to change the control registers from the unlocked to the locked configuration (e.g., by pinning one or more sensitive bits to the relevant control registers). After locking the control registers the hypervisor may change the designation of the startup page to non-executable. Accordingly, in order to change the control register configuration (e.g., CR0, CR4, etc.) code from the startup page (e.g., a reset page) must be executed, forcing the kexec initialization which, in turn, causes a new operating system to boot from the currently-executing operating system. Accordingly, kexec and/or other mechanisms by which a new operating system is booted from a currently-executing operating system may be enabled without loss of security.

Figure 1:
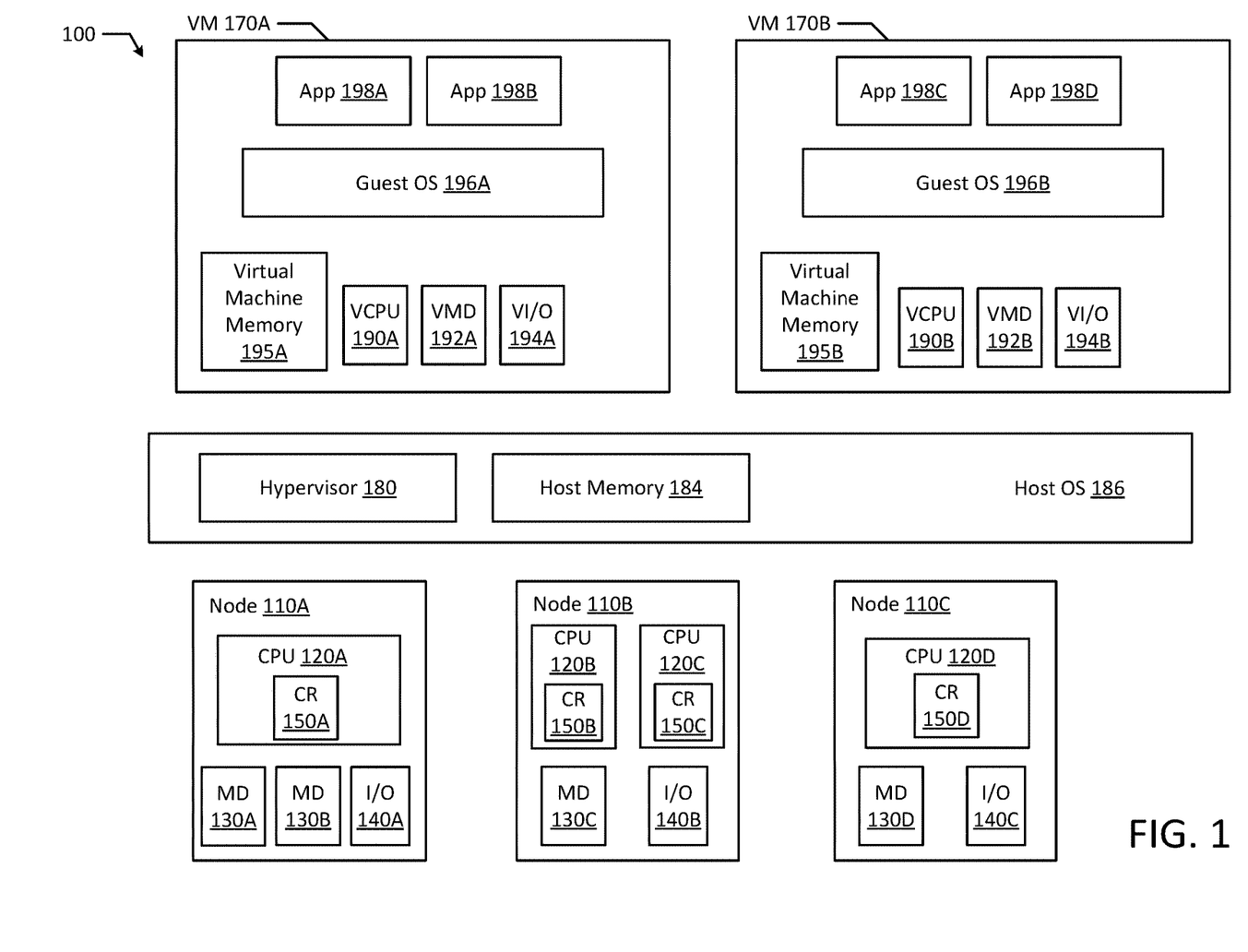
FIG. 1 illustrates a block diagram of an example computer system according to an example embodiment of the present disclosure.

FIG. 1 depicts a high-level component diagram of an example computer system 100 in accordance with one or more aspects of the present disclosure. The computing system 100 may include an operating system (e.g., host OS 186), one or more virtual machines (VM 170A-B) and nodes (e.g., nodes 110A-C).

Virtual machines 170A-B may include a guest OS, guest memory, a virtual CPU (VCPU), virtual memory devices (VMD), and virtual input/output devices (VI/0).

For example, VM 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, VM 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 184. The hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

The hypervisor 180 may be configured to allocate a memory page (e.g., guest-writable memory page) for each page table of a set of page tables used by applications (e.g., applications 198A-D). In an example, the hypervisor 180 may be configured to map each respective memory page (e.g., guest-writable memory page) at a guest physical address in each page table.

In an example, a VM 170A may execute a guest operating system 196A and run applications 198A-B which may utilize the underlying VCPU 190A, VIVID 192A, and VI/O device 194A. One or more applications 198A-B may be running on a VM 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a VM 170A may be dependent on the underlying hardware and/or OS 186. In another example embodiment, applications 198A-B run on a VM 170A may be independent of the underlying hardware and/or OS 186. For example, applications 198A-B run on a first VM 170A may be dependent on the underlying hardware and/or host OS 186 while applications (e.g., application 198C-D) run on a second virtual machine (e.g., VM 170B) are independent of the underlying hardware and/or OS 186A. Additionally, applications 198A-B run on a VM 170A may be compatible with the underlying hardware and/or OS 186. In an example embodiment, applications 198A-B run on a VM 170A may be incompatible with the underlying hardware and/or OS 186. For example, applications 198A-B run on one VM 170A may be compatible with the underlying hardware and/or OS 186A while applications 198C-D run on another VM 170B are incompatible with the underlying hardware and/or OS 186. In an example embodiment, a device may be implemented as a virtual machine (e.g., VM 170A-B).

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each CPU 120A-D may include and/or be in communication with one or more control registers (e.g., CR 150A-D). The control registers may include CR0 and/or CR4, described above, among other possible control registers. Each CR 150A-D may have a configuration that may be either locked or unlocked, as controlled by a sensitive bit (e.g., an access flag) associated with the respective control registers CR 150A-D. As described herein, hypervisor 180 may be effective to change the configuration from CR 150A-D from locked to unlocked configurations and vice versa. In at least some examples, hypervisor 180 may change the configurations from locked to unlocked in response to the detection of a startup page fault caused by a guest (e.g., VM 170A-B) attempting to execute code on a startup page designated as non-executable. Additionally, as described in further detail below, after configuring one or more of CR 150A-D, VM 170A-B may make a hypercall to hypervisor 180 instructing hypervisor 180 to change the configuration of one or more of CR 150A-D from an unlocked configuration to a locked configuration.

Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

As used herein, physical processor or processor (e.g., CPU 120A-D) refers to a device capable of executing instructions encoding arithmetic, logical, and/or I/O operations. In one illustrative example, a processor may follow a Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as random access memory (RAM), read only memory (ROM), electrically erasable read only memory (EEPROM), or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
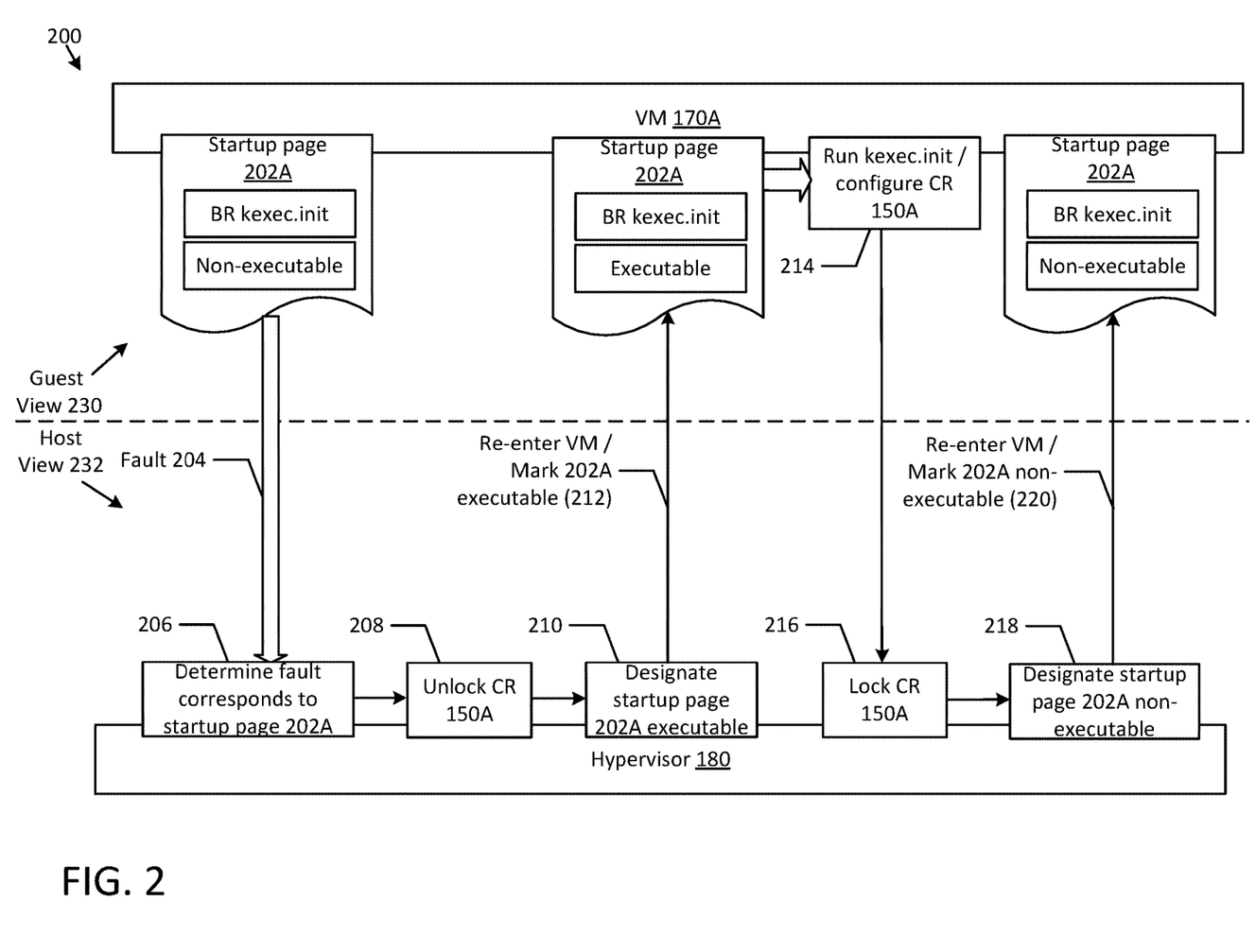
FIG. 2 illustrates example communications between a hypervisor and guest according to an example embodiment of the present disclosure.

FIG. 2 illustrates example communications of a system 200, for example, between a hypervisor and guest according to an example embodiment of the present disclosure. FIG. 2 is conceptually divided into guest view 230, representing actions taken by guest virtual machines, and host view 232, representing actions taken by hypervisor 180 of the host. VM 170A (e.g., a guest VM) may allocate a memory page as a startup page 202A including a branch to a kexec initialization routine (e.g., "BR kexec.init" in FIG. 2). Hypervisor 180 may designate startup page 202A as non-executable. Additionally, the kexec routine may be modified to jump to the correct offset on startup page 202A, instead of directly to the kexec initialization routine. Accordingly, when guest VM 170A attempts to execute the kexec routine, a fault 204 occurs due to the startup page 202A being designated non-executable.

Upon determining fault 204, hypervisor 180 may determine that the fault corresponds to an attempt to execute code on the non-executable startup page 202A (block 206). In response to the determination that the fault 204 occurred on the startup page 202A, hypervisor 180 may change the configuration of one or more control registers (e.g., CR 150A, etc.) from a locked configuration to an unlocked configuration (block 208). Additionally, hypervisor 180 may designate the startup page 202A as executable by changing the designation of the startup page 202A from non-executable to executable (block 210).

Subsequently, VM 170A may be re-entered (action 212) and startup page 202A may be designated as executable. VM 170A may thereafter run kexec and may configure the unlocked control register(s) (e.g., CR 150A) (block 214). After configuring the control register 150A, VM 170A may make a hypercall to hypervisor 180. The hypercall may indicate that control register 150A has been configured. Accordingly, hypervisor 180 may change the configuration of control register 150A from the unlocked configuration to the locked configuration (e.g., by setting a sensitive bit to make the control register configuration "sticky") (block 216). Additionally, hypervisor 180 may designate startup page 202A as non-executable (block 218) and may re-enter the guest VM 170A (action 220).

Figure 3:
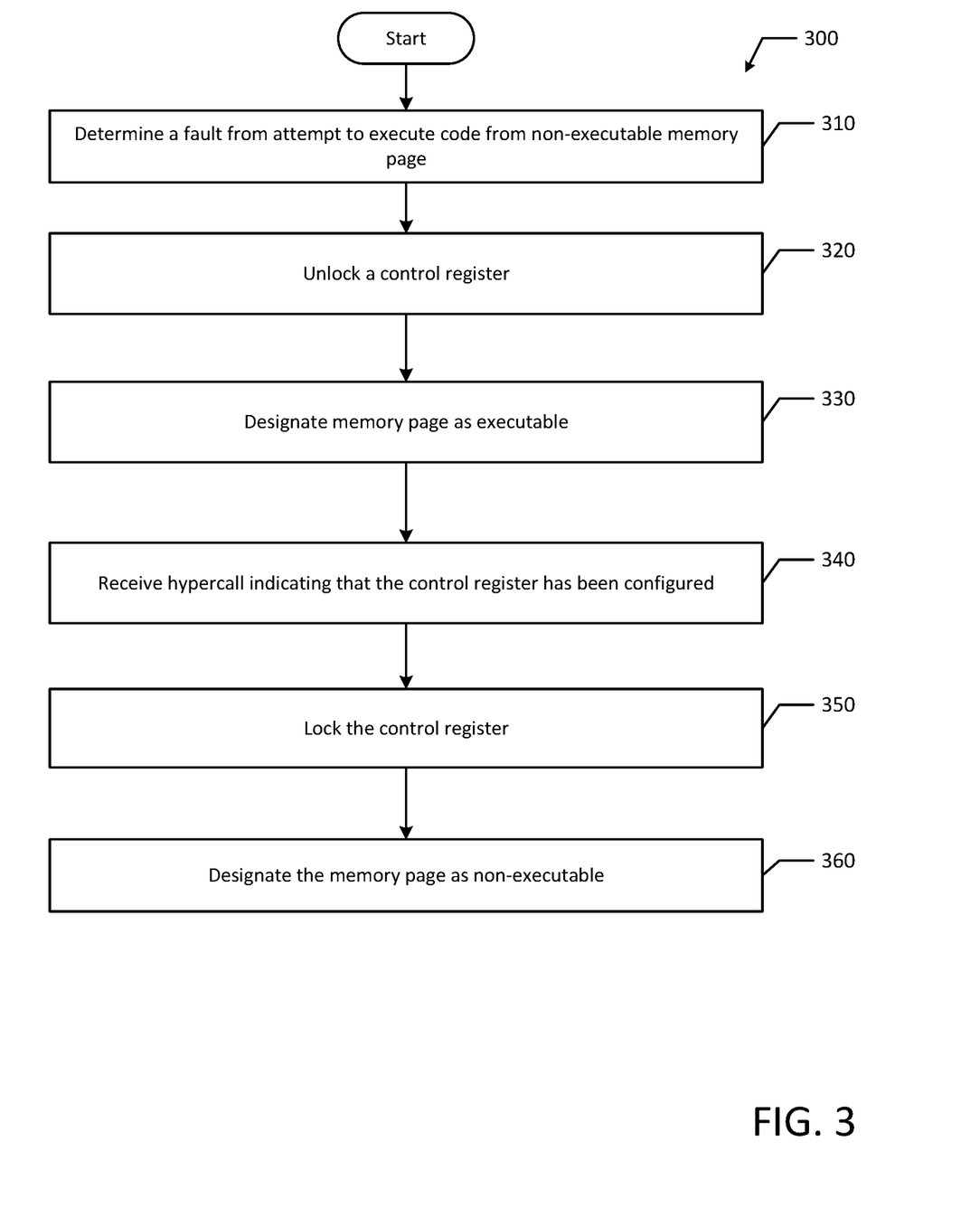
FIG. 3 illustrates a flowchart of an example process for processor control register configuration support according to an example embodiment of the present disclosure.

FIG. 3 illustrates a flowchart of an example process 300 for processor control register configuration support in accordance with an example embodiment of the present disclosure. Although the example process 300 is described with reference to the flowchart illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional. The process 300 may be performed by processing logic that may comprise hardware (circuitry, dedicated logic, etc.), software, or a combination of both. In some examples, the actions described in the blocks of the process 300 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

The example process 300 includes determining a fault resulting from an attempt to execute code from a memory page designated as non-executable (block 310). For example, hypervisor 180 may determine that a guest (e.g., guest VM 170A) has attempted to execute code on a startup page (e.g., startup page 202A) designated as non-executable. The attempt to execute code on a memory page designated as non-executable may result in a protection fault (e.g., fault 204). In various examples, other blocks in process 300 may be executed based on a determination by the hypervisor 180 that the fault occurred on a startup page. Further, in some examples, the hypervisor 180 may check to ensure that an offset specified by the fault corresponds to the offset at which the branch to the kexec initialization code begins on startup page 202A, prior to performing subsequent actions of process 300.

In an example, the process 300 may include unlocking a control register (block 320). For example, if the fault occurs on a startup page and/or if the offset matches the expected offset of the branch to the kexec initialization routine on startup page 202A, hypervisor 180 may change the configuration of a control register (e.g., CR0 CR4, etc.) from locked to unlocked. In an example, the hypervisor 180 may unlock a control register by setting a sensitive bit (e.g., an access flag) to allow changes to be made to values stored in the control register. In an example, the process 300 may include designating the memory page as executable (block 330). For example, the hypervisor 180 may designate the startup page 202A as executable, thereby allowing the guest VM 170A to run the kexec initialization routine. Additionally, since the hypervisor 180 has unlocked the control register at block 320, the guest VM 170A may configure values stored in the control register (e.g., by setting one or more bits of the control register). Generally, a locked configuration of a control register prevents a guest from changing a value of bits stored in the control register, while an unlocked configuration allows a guest to change the value of bits in the control register.

In an example, the process 300 may include receiving a hypercall indicating that the control register has been configured (block 340). For example, hypervisor 180 may receive a hypercall from guest VM 170A indicating that kexec has been performed and that the control register 150A has been configured. In some examples, the hypercall may indicate that the control register is to be locked. In an example, the process 300 may include locking the control register (block 350). For example, the control register (e.g., CR 150A, which may represent CR4, CR0 etc.) may be locked in response to receiving the hypercall indicating that the control register has been configured. Hypervisor 180 may lock the control register by setting a sensitive bit (e.g., an access flag) to make the control register configuration sticky.

In an example, the process 300 may include designating the memory page as non-executable (block 360). Hypervisor 180 may designate the startup page 202A as non-executable. Accordingly, if guest VM 170A, or another guest, attempts to execute code on the non-executable startup page 202A, a fault will occur that may then trigger the hypervisor to unlock the control registers and/or mark the startup page 202A as executable.

Figure 4A:
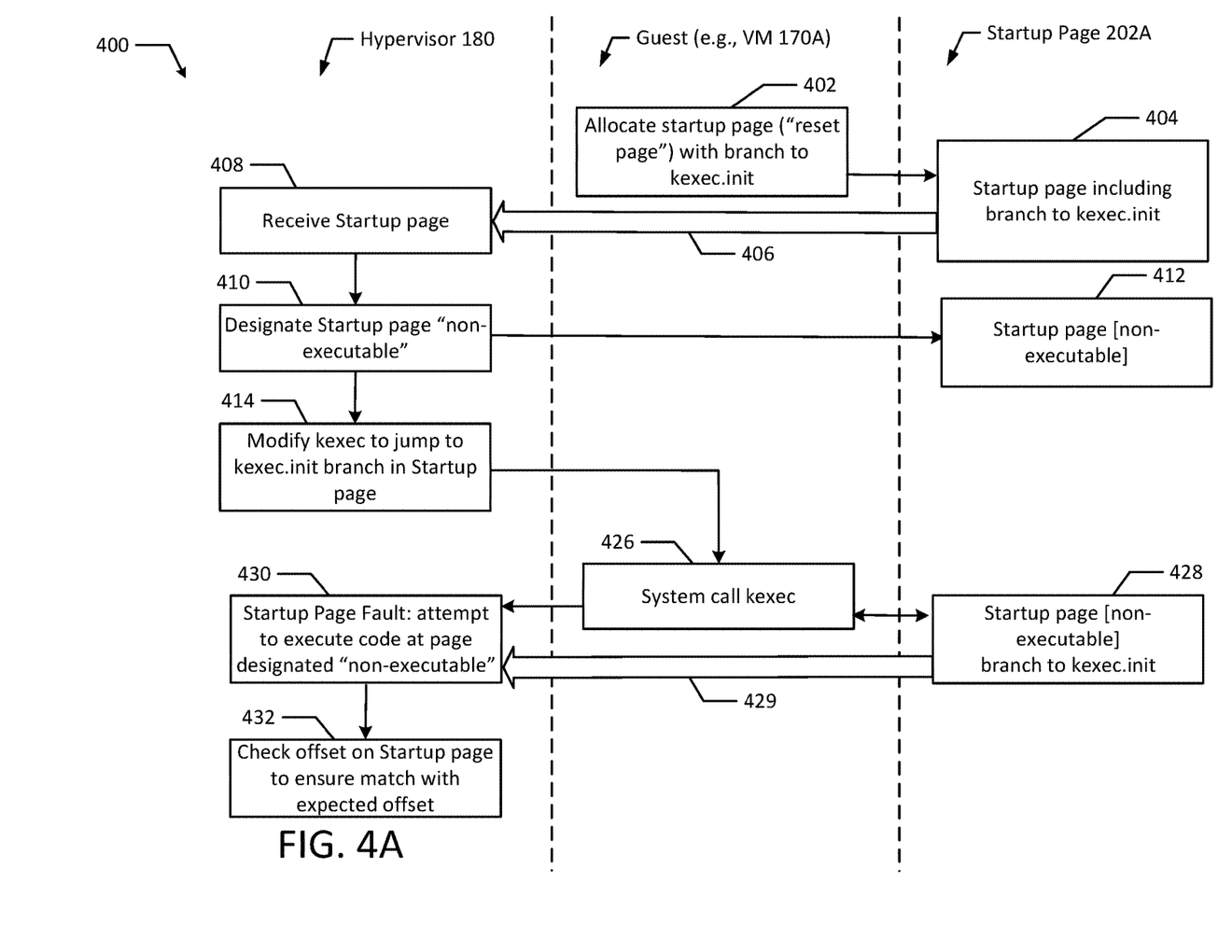
FIGS. 4A and 4B illustrate a flow diagram of an example process for processor control register configuration support according to an example embodiment of the present disclosure.
Figure 4B:
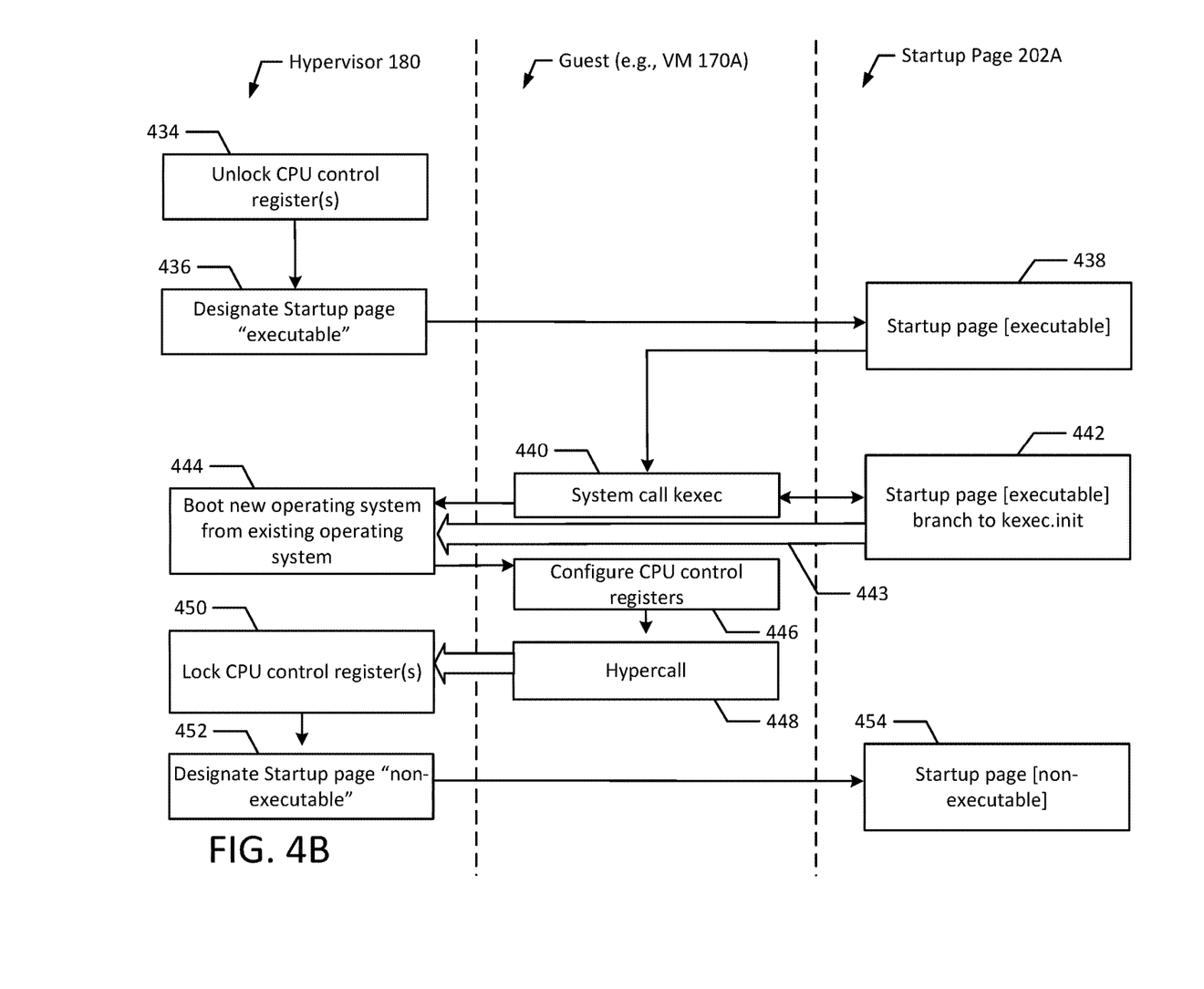

FIGS. 4A and 4B illustrate a flow diagram of an example process 400 for process control register configuration support in accordance with an example embodiment of the present disclosure. Although the example method 400 is described with reference to the flow diagram illustrated in FIGS. 4A and 4B, it will be appreciated that many other methods of performing the acts associated with the process 400 may be used. For example, the order of some of the blocks may be changed, certain blocks may be combined with other blocks, blocks may be repeated, and some of the blocks described are optional. The process 400 may be performed by processing logic that may comprise hardware (circuitry, dedicated logic, etc.), software, or a combination of both. For example, hypervisor 180 and VM 170A may communicate to perform example process 400. In some examples, the actions described in the blocks of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices.

In the illustrated example, a guest (e.g., VM 170A) may allocate a startup page (e.g., a reset page including a branch to kexec causing a new operating system to boot from a currently-executing operating system) including a branch to the kexec initialization routine (e.g., kexec.init) (block 402). Accordingly, startup page 202A may be allocated and may include a branch to kexec.init at some offset within startup page 202A (block 404). The startup page 202A may be sent to the hypervisor 180 (block 406).

Upon receipt of startup page 202A (block 408), hypervisor 180 may designate the startup page 202A as non-executable (block 410). Accordingly, data stored in the memory addresses representing the startup page 202A may be designated as non-executable (block 412). Additionally, hypervisor 180 (and/or some component of the operating system) may modify the kexec routine to jump to the address of the kexec initialization branch at the correct offset in the startup page 202A (block 414). Subsequently, the guest VM 170A may be re-entered.

Guest VM 170A may make a system call to perform kexec (block 426). The kexec routine may jump to the branch to the kexec initialization routine at the offset in the startup page 202A (block 428). However, an attempt by guest VM 170A to execute the code at the branch to the kexec initialization routine in startup page 202A generates a protection fault, as startup page 202A has been previously designated as non-executable by hypervisor 180 (e.g., at block 410). Accordingly, fault 429 is sent to hypervisor 180 resulting from an attempt to execute code on a memory page marked non-executable. Hypervisor 180 detects the startup page fault and may determine that the memory page at which the fault occurred is startup page 202A (block 430). In an example, hypervisor 180 may check the offset indicated by the protection fault to ensure that the offset matches the offset of the kexec initialization branch code of startup page 202A (block 432).

As illustrated in FIG. 4B, the hypervisor 180 unlocks the CPU control register(s) (block 434) provided that the offset in the fault 429 matches the expected offset of the kexec branch within the startup page 202A. In various examples, if the offset in the fault 429 does not match the expected offset of the kexec branch within startup page 202A the hypervisor 180 may maintain the locked CPU control register(s) configuration and/or the non-executable designation of startup page 202A. The hypervisor 180 may unlock the CPU control register(s) by changing the value of one or more sensitive bits (e.g., access control flags) to allow values stored in the control register(s) to be changed. Additionally, the hypervisor 180 may designate the startup page 202A as executable (block 436). Accordingly, the designation of startup page 202A may be changed from non-executable to executable (block 438). Thereafter, the hypervisor 180 may re-enter the guest (e.g., VM 170A).

The guest (VM 170A) may make a system call to perform kexec (block 440). The system call may jump to the offset on startup page 202A that includes the branch to the kexec initialization routine (block 442). As the startup page 202A is now designated as executable, the kexec initialization routine may be executed and kexec may cause (action 443) hypervisor 180 to boot a new operating system from a currently-executing operating system (e.g., an existing operating system) (block 444). Guest (e.g., VM 170A) may configure the CPU control registers at block 446 since the CPU control registers were previously unlocked by hypervisor 180 at block 434 in response to detection of fault 429. Guest (e.g., VM 170A) may change one or more bit values in the control registers (e.g., CR0, CR4, etc.). After configuration of the CPU control registers, the guest may make a hypercall (block 448) that may be sent to the hypervisor 180. The hypercall may indicate that the CPU control registers have been configured and/or may comprise instructions to lock the CPU control registers. Accordingly, at block 450, hypervisor 180 may lock the CPU control register(s) by setting a sensitive bit (e.g., an access control bit) effective to make the configuration of the CPU control register(s) sticky. Additionally, at block 452, hypervisor 180 may change the designation of startup page 202A from executable to non-executable. Accordingly, startup page 202A may include the designation "non-executable" (block 454). Accordingly, the next time the guest runs kexec a protection fault is generated that causes the hypervisor to unlock the control registers.

Figure 5:
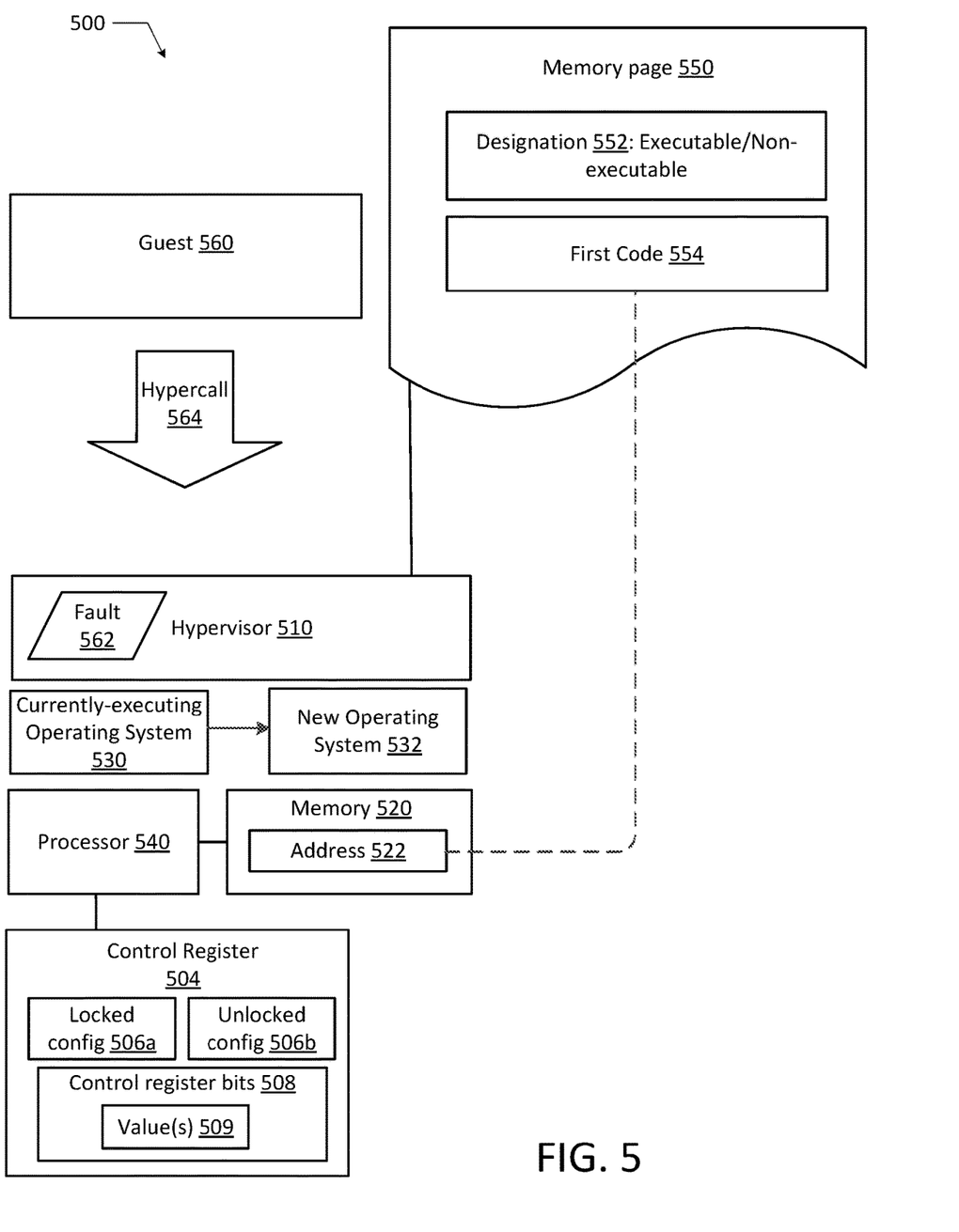
FIG. 5 illustrates a block diagram of an example processor control register configuration support system according to an example embodiment of the present disclosure.

FIG. 5 is a block diagram of an example process control register configuration support system 500 according to an example embodiment of the present disclosure. The system 500 includes a memory 520, a processor 540 in communication with the memory 520, a control register 504 included in and/or in communication with processor 540, a hypervisor 510, a currently-executing operating system 530, a new operating system 532, and a guest 560 (e.g., a guest virtual machine such as VM170A-B of FIG. 1).

Initially, the physical host computing device may be running a currently-executing operating system 530 (e.g., host OS 186 of FIG. 1). Guest 560 allocates memory page 550 at address 522 in memory 520. Memory page 550 may include first code 554 comprising a branch to a kexec initialization routine. Memory page 550 may have a designation 552 of either executable or non-executable. Memory page 550 may initially be designated non-executable by hypervisor 510. Additionally, hypervisor 510 may modify kexec to jump to the first code 554 (e.g., at an offset within memory page 550) instead of directly executing the kexec initialization routine.

Guest 560 may make a system call to run kexec. In response, kexec may jump to first code 554 causing a fault 562 to be detected by hypervisor 510 due to the guest 560 attempting to execute the first code 554 from a memory page 550 designated as non-executable by designation 552. Hypervisor 510 may determine that the fault resulted from attempted execution of first code 554 on memory page 550 while memory page 550 was designated as non-executable. Hypervisor 510 may change a configuration of control register 504 from locked configuration 506a to unlocked configuration 506b. In some examples, hypervisor 510 may first check that an offset indicated within the fault 562 matches the expected offset of the first code 554 within memory page 550 prior to unlocking the control register 504. In an example, hypervisor 510 may change the control register from locked configuration 506a to unlocked configuration 506b by changing the value of a sensitive bit used to control access to the control register bits 508 (rendering the control register configuration "non-sticky").

Hypervisor 510 may also change the designation 552 of the memory page 550 from non-executable to executable. Thereafter, guest 560 may be re-entered and may again make a system call to run kexec. Now, as hypervisor 510 has changed designation 552 of memory page 550 to executable, the first code 554 may be executed causing the kexec initialization routine to run. Running kexec may cause new operating system 532 to boot directly from currently-operating system 530 (in some examples skipping the bootloader stage and/or the hardware initialization phase performed by system firmware during the booting of the new operating system 532).

Guest 560 may change bit values (e.g., value(s) 509) of the control register bits 508 stored in control register 504 while control register 504 is in the unlocked configuration 506b. After configuring the control register 504, guest 560 may make hypercall 564 to hypervisor 510 causing hypervisor 510 to change the configuration of control register 504 from the unlocked configuration 506b back to the locked configuration 506a. Additionally, hypervisor 510 may change the designation 552 of memory page 550 from executable back to non-executable.

Among other potential benefits, the various systems and techniques described herein provide CPU control register configuration support without requiring a CPU reset. This enables fast-reboot techniques such as kexec to be enabled without loss of security. For example, the only way to change the values of sensitive control register bits (such as those enabling SMAP/SMEP and write protect) is through an allocated startup page which forces the kexec initialization to boot a new operating system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as application specific integrated circuits (ASICs), field programmable gate arrays (FPGAs), digital signal processors (DSPs) or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a processor in communication with the memory;
   a control register in communication with the processor; and
   a hypervisor configured to:
   determine a fault resulting from a guest attempting to execute first code from a memory page designated as non-executable, wherein the first code is configured to cause a new operating system to boot from a currently-executing operating system;
   change a configuration of the control register from a locked configuration to an unlocked configuration based at least in part on the fault;
   change the memory page from non-executable to executable;
   receive a hypercall from the guest after execution of the first code, the hypercall indicating that the control register has been configured by the guest after booting the new operating system;
   change the configuration of the control register from the unlocked configuration to the locked configuration; and
   change the memory page from executable to non-executable.

2. The system of claim 1, wherein the hypervisor is further configured to:
   determine that the memory page is a startup page, wherein the hypervisor is configured to change the configuration of the control register from the locked configuration to the unlocked configuration based at least in part on the determination that the memory page is the startup page.

3. The system of claim 1, wherein the hypervisor is further configured to:
   determine a first offset of an address on the memory page specified by the fault;
   determine a second offset of the first code configured to cause the new operating system to boot from the currently-executing operating system;
   determine that the first offset matches the second offset; and
   change the configuration of the control register from the locked configuration to the unlocked configuration based at least in part on the determination that the first offset matches the second offset.

4. The system of claim 1, wherein the hypervisor is further configured to:
   pass control of the processor to the guest after changing the memory page from non-executable to executable, wherein the guest executes the first code at the address of the memory page.

5. The system of claim 1, wherein the execution of the first code causes the new operating system to boot from a currently-executing operating system using kexec.

6. The system of claim 1, wherein the control register is CR0 or CR4.

7. The system of claim 1, wherein the hypervisor is further configured to determine whether the fault is associated with the memory page comprising a branch to kexec initialization code.

8. The system of claim 1, wherein the fault is caused by the memory page designated as non-executable for the guest attempting to execute the first code at a first privilege level.

9. A method comprising:
   determining, by a hypervisor, a fault resulting from a guest attempting to execute first code from a memory page designated as non-executable, wherein the first code is configured to cause a new operating system to boot from a currently-executing operating system;
   changing, by the hypervisor, a configuration of a control register associated with a processor from a locked configuration to an unlocked configuration based at least in part on the fault;
   changing, by the hypervisor, the memory page from non-executable to executable;
   receiving, by the hypervisor from the guest after execution of the first code, a hypercall indicating that the control register has been configured by the guest after booting the new operating system;

changing, by the hypervisor, the configuration of the control register from the unlocked configuration to the locked configuration; and changing, by the hypervisor, the memory page from executable to non-executable.

10. The method of claim 9, further comprising:

determining, by the hypervisor, that the memory page is a startup page, wherein the hypervisor is configured to change the configuration of the control register from the locked configuration to the unlocked configuration based at least in part on the determination that the memory page is the startup page.

11. The method of claim 9, further comprising:

determining, by the hypervisor, a first offset of an address on the memory page specified by the fault;

determining, by the hypervisor, a second offset of the first code configured to cause the new operating system to boot from the currently-executing operating system;

determining, by the hypervisor, that the first offset matches the second offset; and changing, by the hypervisor, the configuration of the control register from the locked configuration to the unlocked configuration based at least in part on the determination that the first offset matches the second offset.

12. The method of claim 9, further comprising:

passing, by the hypervisor, control of the processor to the guest after changing the memory page from non-executable to executable, wherein the guest executes the first code at the address of the memory page.

13. The method of claim 9, further comprising:

executing the first code, by the guest, to cause the new operating system to boot from a currently-executing operating system using kexec.

14. The method of claim 9, wherein the control register is CR0 or CR4.

15. The method of claim 9, further comprising:

determining, by the hypervisor, whether the fault is associated with the memory page comprising a branch to kexec initialization code.

16. The method of claim 9, wherein the fault is caused by the memory page designated as non-executable for the guest attempting to execute the first code at a first privilege level.

17. A non-transitory machine readable medium storing a program, which when executed by a processor causes a hypervisor to:

determine a fault resulting from a guest attempting to execute first code from a memory page designated as non-executable, wherein the first code is configured to cause a new operating system to boot from a currently-executing operating system;

change a configuration of a control register associated with the processor from a locked configuration to an unlocked configuration based at least in part on the fault;

change the memory page from non-executable to executable;

receive a hypercall from the guest after execution of the first code, the hypercall indicating that the control register has been configured by the guest after booting the new operating system;

change the configuration of the control register from the unlocked configuration to the locked configuration; and change the memory page from executable to non-executable.

18. The non-transitory machine readable medium of claim 17, which, when executed by the processor, further causes the hypervisor to:

determine that the memory page is a startup page, wherein the hypervisor is configured to change the configuration of the control register from the locked configuration to the unlocked configuration based at least in part on the determination that the memory page is the startup page.

19. The non-transitory machine readable medium of claim 17, which, when executed by the processor, further causes the hypervisor to:

determine a first offset of an address on the memory page specified by the fault;

determine a second offset of the first code configured to cause the new operating system to boot from the currently-executing operating system;

determine that the first offset matches the second offset; and change the configuration of the control register from the locked configuration to the unlocked configuration based at least in part on the determination that the first offset matches the second offset.

20. The non-transitory machine readable medium of claim 17, which, when executed by the processor, further causes the hypervisor to:

pass control of the processor to the guest after changing the memory page from non-executable to executable, wherein the guest executes the first code at the address of the memory page.

* * * * *

UNITED STATES PATENT AND TRADEMARK OFFICE
CERTIFICATE OF CORRECTION

PATENT NO. : 11,397,602 B2
APPLICATION NO. : 16/857455
DATED : July 26, 2022
INVENTOR(S) : Michael Tsirkin It is certified that error appears in the above-identified patent and that said Letters Patent is hereby corrected as shown below:

In the Specification

In Column 3, Line 34, replace "wtite" with -- write --.

In Column 4, Line 67, replace "VI/0" with -- VI/O --.

In Column 5, Line 33, replace "VIVID" with -- VMD --.

In Column 8, Line 14, replace "CR0 CR4," with -- CR0, CR4, --.

In Column 8, Line 40, replace "CR4, CR0 etc." with -- CR4, CR0, etc. --.

Signed and Sealed this
Fourth Day of October, 2022

Katherine Kelly Vidal
*Director of the United States Patent and Trademark Office*